May 3, 1927.

A. F. MANGOLD 1,626,852

DUST COLLECTOR

Filed Oct. 7, 1926

INVENTOR.
ABERHAM F. MANGOLD.
BY
ATTORNEY.

Patented May 3, 1927.

1,626,852

UNITED STATES PATENT OFFICE.

ABERHAM FRANKLIN MANGOLD, OF AKRON, OHIO.

DUST COLLECTOR.

Application filed October 7, 1926. Serial No. 140,008.

This invention relates to dust collectors or separators.

The general purposes of the invention is to provide an improved dust collector capable of operating at maximum efficiency at all times.

More particularly the invention is directed to the combination with a dust collecting element of freely movable pellets, such as balls or the like, operable on the dust collecting surface of the element to liberate the dust therefrom.

A specific object of the invention is the provision of a dust collecting rotary drum having freely movable pellets operable on the dust collecting surfaces thereof by rotation of the drum and gravity.

Another specific object is the provision of freely movable pellets in that type of dust collector including a drum to which the dust laden air is delivered, radial tubes or pockets of separating material in which the dust collects, jarring apparatus for emptying the loose dust from the tubes or pockets and a conveyor for receiving the dirt jarred therefrom.

Another object of the invention is to provide, in combination with a drum or radial pocket type of dust collector to which air is supplied at one end of the drum, a number of freely movable pellets, and means for feeding the pellets from the end remote from the air inlet toward the air inlet against the current of entering air.

Another object is to provide in such dust collectors, including means for conveying the dust therefrom, means for trapping pellets or balls accidently falling into the dust conveyor.

The foregoing and other objects are obtained by the construction illustrated in the accompanying drawings. It is to be understood that the invention is not limited to the specific form thereof shown and described.

Figure 1:
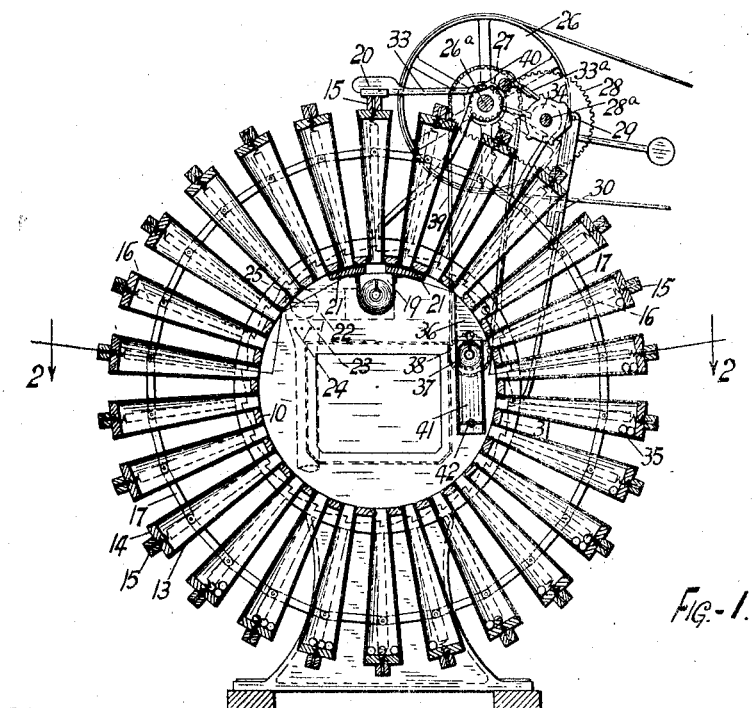
Figure 2:
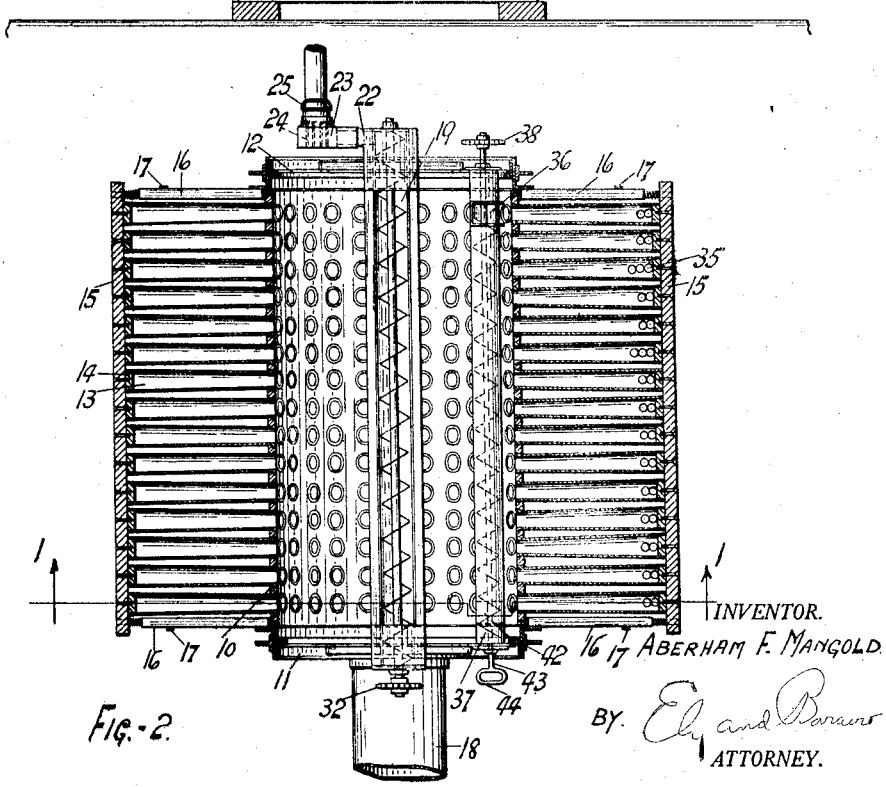

Of the accompanying drawings,

Figure 1 is a transverse section through a dust collector embodying the invention, the section being taken on line 1—1 of Figure 2; and Figure 2 is a sectional plan thereof on line 2—2 of Figure 1.

The numeral 10 designates an intermittently rotatable drum mounted on fixed heads 11 and 12 and having radiating therefrom, preferably in any required number of circumferential series, pockets defined by tubes 13 of dust collecting fabric to provide a dust collector of the required capacity.

The tubes 13 are secured at their inner ends over apertures in drum 10 and at their outer ends, which are sealed by end pieces 14, to cross pieces 15, 15 which are in turn yieldingly mounted on the ends of spider arms 16, 16 held in radial positions adjacent the ends of drum 10 by tie members 17, 17.

Arranged to deliver dust laden air to drum 10 is a duct 18 delivering through head 11. For removal of dust from the collector a screw conveyor 19 is arranged between heads 11 and 12 to receive dust from tubes 13 in succession, the conveyor 19 being arranged under a position to which each longitudinal set of tubes is moved in succession beneath jarring devices 20 operable against crosspieces 15 to shake the fabric in tubes 13 into conveyor 19, the sets of tubes when positioned over conveyor 19 being sealed from the pressure of air in drum 10 by pads 21, 21 on opposite sides of conveyor 19.

Conveyor 19 is arranged to deliver dust to a duct 22 and the latter to a duct 23 through a screen 24 of such mesh as to trap pellets accidently delivered from the collector by the dust conveyor, a hand hole 25 being provided adjacent screen 24 for removing the trapped pellets or balls therefrom.

The intermittent driving of drum 10 is preferably effected by a pulley 26 driving shaft 26ª extended the full length of the machine and having pinions, such as indicated at 27, on both ends meshed with gears 28 on a shaft 28ª and having thereon crank pins 29 from which depend pawls 30 engaging ratchet wheels 31 secured to the ends of drum 10.

The conveyor 19 may be continuously driven by a sprocket 32 driven by a chain (not shown) trained over another sprocket (not shown) secured on shaft 26ª. This arrangement in dust collectors is old and well-known and needs no further description or illustration.

The jarring devices 20 are operable against cross-pieces 15 by levers such as 33 having arms 33ª thereon engaged by spaced elevations on cams 34 secured on the shaft 28ª, the cam elevations being designed to elevate the devices 20 and then permit them to fall against cross-pieces 15. One elevation of the cam as shown is of sufficient extent to provide a dwell in the operation of the devices 20 during rotary movement of drum 10.

The drum 10 is supplied with a suitable number of pellets 35, preferably in the form of balls. The balls 35 may be of any suitable material having a comparatively high density and preferably of yielding or resilient material. Balls of tough rubber composition may be used in ordinary situations. Where subjected to heat, rubber compounded with asbestos fibre is suggested as suitable material for the balls.

The balls 35 by action of gravity tend to find their way into pockets or tubes 13 in positions extending downwardly from the drum and are carried up by rotation of the drum until they roll by gravity out of these pockets into others at or approaching the lowermost positions. In tumbling in pockets or tubes 13 and through drum 10 the balls are also subjected to the action of the air currents, whereby the balls are caused to continuously loosen dust from all the surfaces of all the tubes so that the mesh of the fabric of the tubes does not become clogged and periodical cleaning of the tubes by removal from the dust collector is obviated.

Due to the force of the entering air the balls 35 are crowded toward the remote end of the drum and ultimately find their ways into the last circumferential series of tubes. In order to redistribute the balls and thus maintain them in operation uniformly on all the tubes, a hopper or trough 36 is provided to receive the balls rolling from the tubes 13 at the end remote from that of the entering air and is arranged to deliver the balls to a suitable conveyor, such as a screw conveyor 37, arranged between heads 11 and 12 and driven by a sprocket 38, chain 39 and drive sprocket 40 on shaft 26$^a$ so as to feed the balls 35 back to the air inlet end of drum 10. A storage receptacle 41 is arranged to receive the balls from conveyor 37 and to direct them down onto the inner surface of drum 10, a slide 42 being operable across the bottom of receptacle 41 by a rod 43 extended through head 11 and having an operating handle 44 thereon, slide 42 being adapted to close the bottom of receptacle 41 to trap the balls 35 therein when it is desired to dispense with the cleaning process.

In use, the dust collector is operated in exactly the same manner as has been customary in the past and the balls 35, being under the influence of gravity, the lifting action of the tubes rising from the lowermost positions and the air currents through the drum and tubes, are indiscriminately tumbled back and forth from certain tubes to certain other tubes and are more or less vibrated therein so as to rub the surfaces of the tubes 13 and frictionally loosen the dust in the mesh thereof.

The balls 35, unless accidently clogged in tubes 13, will roll out as the tubes approach the 45° position on their upward course. The loosened dirt is then jarred from the tubes in their uppermost position by devices 20 while over conveyor 19. Any balls 35 which may have clogged in tubes 13 will be freed and will be discharged into conveyor 19, but will be trapped by screen 24 and may be removed therefrom through hand hole 25 and be replaced in drum 10.

The balls travel progressively from one circumferential series of tubes to another from the air inlet end toward the other end of drum 10. At the latter end they fall into conveyor 37 and are fed back to the air inlet end, thus being maintained in circulation throughout the entire length of the drum.

It is usually necessary to operate the cleaning device only periodically. Accordingly slide 42 may be shut to trap the balls in receptacle 41 when it is not desired to operate the cleaning device. The cleaning operation may again be started by merely opening slide 42, permitting the balls to fall back into drum 10.

It will appear from the foregoing that the dust collector need not be stopped in order to clean the collecting cloth and that the tubes need not be removed for any other purpose than replacement of worn out tubes with new ones.

Modifications of the invention may be resorted to without departing from the spirit thereof or the scope of the appended claims.

What is claimed is:

1. A dust collector comprising an intermittently rotatable drum, tubes or pockets of dust collecting fabric radiating from the drum, a number of freely movable pellets comprising rubber balls in the drum adapted to find their ways into the tubes or pockets and to frictionally engage the dust collecting surfaces of the fabric to loosen the dust therefrom, a conveyor for receiving the dust from the tubes or pockets, means for jarring the dust from the tubes or pockets into the conveyor, a duct adapted to deliver dust laden air into one end of the drum, a duct for receiving the dust from the dust conveyor through the other end of the drum, a screen in the dust receiving duct, said duct having a hand hole therein adjacent the screen, a hopper for receiving the pellets falling out of tubes or pockets at said other end of the drum, a conveyor for delivering the pellets from said hopper to the first end of the drum, a receptacle for receiving the pellets from the pellet-delivering conveyor, said receptacle having a bottom closure, and means for opening or shutting said closure.

2. A dust collector comprising an intermittently rotatable drum, tubes or pockets of dust collecting fabric radiating from the drum, a number of freely movable pellets in the drum adapted to find their ways into the tubes or pockets and to frictionally engage the dust collecting surfaces of the fabric to loosen the dust therefrom, a conveyor for receiving the dust from the tubes or pockets, means for jarring the dust from the tubes or pockets into the conveyor, a duct adapted to deliver dust laden air into one end of the drum, a duct for receiving the dust from the dust conveyor, a hopper for receiving the pellets falling out of the tubes or pockets at the other end of the drum, a conveyor for delivering the pellets from said hopper to the first end of the drum, a receptacle for receiving the pellets from the pellet-delivering conveyor, said receptacle having a bottom closure, and means for opening or shutting said closure.

3. A dust collector comprising an intermittently rotatable drum, tubes or pockets of dust collecting fabric radiating from the drum, a number of freely movable pellets in the drum adapted to find their ways into the tubes or pockets and to frictionally engage the dust collecting surfaces of the fabric to loosen the dust therefrom, a conveyor for receiving the dust from the tubes or pockets, means for jarring the dust from the tubes or pockets into the conveyor, a duct adapted to deliver dust laden air into one end of the drum, a duct for receiving the dust from the dust conveyor, a hopper for receiving the pellets falling out of the tubes or pockets at the other end of the drum, and a conveyor for delivering the pellets from said hopper to the first end of the drum.

4. A dust collector comprising an intermittently rotatable drum, tubes or pockets of dust collecting fabric radiating from the drum, a number of freely movable pellets in the drum adapted to find their ways into the tubes or pockets and to frictionally engage the dust collecting surfaces of the fabric to loosen the dust therefrom, a conveyor for receiving the dust from the tubes or pockets, means for jarring the dust from the tubes or pockets into the conveyor, a duct adapted to deliver dust laden air into one end of the drum, a duct for receiving the dust from the dust conveyor, and means for conveying the pellets from the other end of the drum back to the first-mentioned end thereof.

5. A dust collector comprising an intermittently rotatable drum, tubes or pockets of dust collecting fabric radiating from the drum, a number of freely movable pellets in the drum adapted to find their ways into the tubes or pockets and to frictionally engage the dust collecting surfaces of the fabric to loosen the dust therefrom, a conveyor for receiving the dust from the tubes or pockets, means for jarring the dust from the tubes or pockets into the conveyor, a duct adapted to deliver dust laden air into one end of the drum, and a duct for receiving the dust from the dust conveyor.

6. A dust collector comprising an intermittently rotatable drum, tubes or pockets of dust collecting fabric radiating from the drum, a number of freely movable pellets in the drum adapted to find their ways into the tubes or pockets and to frictionally engage the dust collecting surfaces of the fabric to loosen the dust therefrom, a conveyor for receiving the dust from the tubes or pockets, and means for jarring the dust from the tubes or pockets into the conveyor.

7. A dust collector comprising a rotatable drum, tubes or pockets of dust collecting fabric radiating from the drum, and a number of freely movable pellets in the drum adapted to find their ways into the tubes or pockets and to frictionally engage the dust collecting surfaces of the fabric to loosen the dust therefrom.

8. A dust collector comprising a rotatable drum having a dust collecting fabric thereon, means for admitting dust laden air to the interior of the drum, the air to be expelled outwardly through the fabric, and a number of pellets in the drum adapted to be tumbled into frictional engagement with the dust-collecting surfaces of the fabric to loosen the dirt therefrom.

9. A dust collector comprising a circumferential series of radial fabric tubes or pockets, means to supply dust laden air to the inner surfaces of said tubes or pockets to be expelled outwardly therethrough, means for circumferentially rotating the tubes or pockets, freely movable pellets operable in the tubes or pockets in frictional engagement with the dust collecting surfaces on the inner walls thereof to loosen the dust from the fabric, means operable on the tubes at one point in their travel to jar the dust therefrom, and a conveyor for receiving the dust at said point and delivering it from the machine.

10. In a dust collector including a fabric dust collecting element, means for periodically jarring said element, and freely movable pellets operable in frictional engagement with the dust collecting surface of the element to loosen the dust clinging thereto preliminarily with respect to the jarring operation.

11. In a revolving dust collector of the radial fabric pocket or tube type, a number of freely movable pellets adapted to be tumbled indiscriminately therein to clean the pockets or tubes, means for trapping the pellets at will to discontinue the cleaning operation, and means for releasing the pellets from said trapping means to again permit the pellets to tumble in the pockets or tubes.

12. In a revolving dust collector of the radial fabric pocket or tube type, a number of freely movable pellets adapted to be tumbled indiscriminately therein to clean the pockets or tubes, and means for trapping the pellets at will to discontinue the cleaning operation.

13. In a revolving drum type dust collector having radial fabric pockets or tubes, a number of freely movable pellets in the drum adapted to be tumbled indiscriminately into and out of the pockets or tubes to clean the same, means for admitting dust laden air into one end of the drum to be expelled through the pockets or tubes, and means for maintaining the pellets in circulation throughout the length of the drum including a conveyor arranged to receive the pellets at the end of the drum remote from the inlet and to deliver said pellets to the drum at the air inlet end thereof.

14. In a revolving drum type dust collector having radial fabric pockets or tubes, a number of freely movable pellets in the drum adapted to be tumbled indiscriminately into and out of the pockets or tubes to clean the same, means for admitting dust laden air into one end of the drum to be expelled through the pockets or tubes, and means for maintaining the pellets in circulation throughout the length of the drum.

ABERHAM FRANKLIN MANGOLD.